United States Patent
Branecky et al.

(10) Patent No.: US 10,281,351 B2
(45) Date of Patent: May 7, 2019

(54) WATER HEATER AND PRESSURE PROBE FOR A WATER HEATER

(71) Applicant: A. O. Smith Corporation, Milwaukee, WI (US)

(72) Inventors: Brian T. Branecky, Oconomowoc, WI (US); Janice Arline Fitzgerald, Mequon, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 553 days.

(21) Appl. No.: 13/680,856

(22) Filed: Nov. 19, 2012

(65) Prior Publication Data

US 2014/0137812 A1 May 22, 2014

(51) Int. Cl.
*F24H 9/20* (2006.01)
*G01L 19/00* (2006.01)
*F23N 3/00* (2006.01)
*F24H 1/20* (2006.01)
(Continued)

(52) U.S. Cl.
CPC .............. *G01L 19/00* (2013.01); *F23C 3/004* (2013.01); *F23N 3/00* (2013.01); *F23N 3/002* (2013.01); *F24H 1/206* (2013.01); *F24H 9/2035* (2013.01); *G01L 19/003* (2013.01); *G01L 19/0023* (2013.01); *G05D 7/0676* (2013.01); *F23N 2025/06* (2013.01); *F23N 2033/08* (2013.01);
(Continued)

(58) Field of Classification Search
CPC ................................ F24H 9/2035; G01L 19/00
USPC .......................................... 122/14.21; 73/756
See application file for complete search history.

(56) References Cited

U.S. PATENT DOCUMENTS 2,731,974 A    1/1956  Krueger, III
3,067,611 A *  12/1962 Bowers .................. G01F 1/206
                                                     73/861.69
(Continued)

FOREIGN PATENT DOCUMENTS

CN         2415313      1/2001
CN        201497165     6/2010
(Continued)

OTHER PUBLICATIONS

First Office Action from the State Intellectual Property Office of China for Application No. 201310581099.4 dated Apr. 18, 2017 (19 pages).
(Continued)

*Primary Examiner* — Steven B McAllister
*Assistant Examiner* — John Bargero
(74) *Attorney, Agent, or Firm* — Michael Best & Friedrich LLP

(57) ABSTRACT

A pressure probe assembly for attachment to a venturi of a gas-fired appliance, where the venturi includes a body having an inlet end, an outlet end, and a wall defining a mixing chamber extending from the inlet end to the outlet end about an axis. A support member is detachably coupled to the mixing chamber. A first pressure probe is coupled to the support member and has a first pressure tap disposed substantially adjacent the axis. A second pressure probe is coupled to the support member and has a second pressure tap disposed substantially adjacent the mixing chamber wall. Also disclosed is a gas-fired appliance, such as a water heater, including the pressure probe assembly.

12 Claims, 15 Drawing Sheets

(51) Int. Cl.
*G05D 7/06* (2006.01)
*F23C 3/00* (2006.01)

(52) U.S. Cl.
CPC ............. *F23N 2900/05181* (2013.01); *F24D 2220/044* (2013.01)

(56) References Cited

U.S. PATENT DOCUMENTS

| | | | | |
|---|---|---|---|---|
| 3,782,881 | A | * | 1/1974 | Feeney .................. F23D 14/72 431/12 |
| 4,343,194 | A | | 8/1982 | Dehart et al. |
| 4,460,329 | A | * | 7/1984 | Trent ...................... F23N 1/062 126/116 A |
| 4,672,919 | A | | 6/1987 | Staats |
| 4,742,800 | A | * | 5/1988 | Eising .................... F23C 3/004 122/136 R |
| 4,768,444 | A | | 9/1988 | DeWerth et al. |
| 5,159,218 | A | | 10/1992 | Murry et al. |
| 5,222,888 | A | | 6/1993 | Jones et al. |
| 5,365,795 | A | * | 11/1994 | Brower, Jr. ................ 73/861.65 |
| 5,570,659 | A | * | 11/1996 | Cohen .................... F23D 14/34 122/14.21 |
| 5,616,995 | A | | 4/1997 | Hollenbeck |
| 5,636,993 | A | | 6/1997 | Badry |
| 6,216,685 | B1 | | 4/2001 | Payne |
| 6,234,164 | B1 | | 5/2001 | Yasui |
| 6,237,426 | B1 | * | 5/2001 | Gryc ........................ G01F 1/46 73/861.66 |
| RE37,240 | E | * | 6/2001 | Moore et al. .............. 122/406.1 |
| 6,305,369 | B1 | * | 10/2001 | Garloch ................... 126/116 A |
| 6,428,282 | B1 | | 8/2002 | Langley |
| 6,487,918 | B1 | * | 12/2002 | DeAngelis ................ G01F 1/46 73/861.66 |
| 6,824,362 | B2 | | 11/2004 | Dodson, III |
| 2009/0139348 | A1 | | 6/2009 | Speldrich |
| 2009/0241943 | A1 | | 10/2009 | Schwank et al. |
| 2010/0112500 | A1 | | 5/2010 | Maiello et al. |
| 2011/0297110 | A1 | | 12/2011 | Malatesta et al. |

FOREIGN PATENT DOCUMENTS

| | | |
|---|---|---|
| CN | 102072344 | 5/2011 |
| CN | 102109217 | 6/2011 |
| DE | 2011717 | 12/1970 |
| DE | 1778648 | 8/1971 |
| DE | 9403329 | 6/1994 |
| DE | 10159033 | 9/2002 |
| EP | 0567060 | 10/1993 |
| EP | 2312213 | 4/2011 |
| FR | 2687212 | 8/1993 |
| GB | 299090 | 10/1928 |
| GB | 2027851 | 2/1980 |
| GB | 2271443 | 4/1994 |
| JP | 2009210183 | 9/2009 |
| JP | 2009250471 | 10/2009 |
| WO | 9742467 | 11/1997 |

OTHER PUBLICATIONS

EP13193043.0 Partial European Search Report dated Mar. 17, 2017 (6 pages).

EP13193043.0 Extended European Search Report dated May 19, 2017 (11 pages).

* cited by examiner

WATER HEATER AND PRESSURE PROBE FOR A WATER HEATER

BACKGROUND

The invention relates to gas-fired appliances. More specifically, the invention relates to controlling a thermal output in gas-fired appliances such as a water heater. In order to control a thermal output in a gas-fired appliance, it is desirable to measure and control air flow to a combustion chamber.

SUMMARY

In one embodiment, the invention provides a pressure probe assembly for attachment to a venturi of a gas-fired appliance, where the venturi includes a body having an inlet end, an outlet end, and a wall defining a mixing chamber extending from the inlet end to the outlet end about an axis. A support member is detachably coupled to the mixing chamber. A first pressure probe is coupled to the support member and has a first pressure tap disposed substantially adjacent the axis. A second pressure probe is coupled to the support member and has a second pressure tap disposed substantially adjacent the mixing chamber wall.

In another embodiment, the invention provides a water heater. The water heater includes a water storage tank, a burner, and a flue positioned in the water storage tank. The flue receives the products of combustion from the burner. A mixing chamber has a side wall surrounding a fluid path having a center axis. A first fluid conduit is coupled to the mixing chamber and has a first pressure tap disposed substantially adjacent the center axis. A second fluid conduit is coupled to the mixing chamber and has a second pressure tap disposed substantially adjacent the mixing chamber wall. A gas valve is in fluid communication with the mixing chamber. The gas valve is operable to provide gaseous fuel to the mixing chamber. A blower is in fluid communication with the air path, the mixing chamber, and the burner. The blower draws air through the air path into the mixing chamber where the air and gaseous fuel mix to form a fuel-air mixture and provides the fuel-air mixture to the burner. A sensor is in fluid communication with the first fluid conduit and the second fluid conduit. The sensor determines a pressure difference between a first fluid pressure within the first fluid conduit and a second fluid pressure within the second fluid conduit and outputs a signal indicative of the pressure difference. A controller is in communication with the blower and the sensor. The controller determines an input airflow velocity from the signal and controls a speed of the blower in response to changes to the input air flow velocity.

In another embodiment, the invention provides water heater. The water heater includes a water storage tank, a burner, and a flue positioned in the storage tank. The flue receives the products of combustion from the burner. An air path includes an elbow having a wall with an inner surface, a center axis, and an orifice. The inner surface is symmetrical about the centerline and the orifice is formed through the wall. The water heater also includes a mixing chamber and a gas valve in fluid communication with the mixing chamber. The gas valve is operable to provide gaseous fuel to the mixing chamber. A blower is in fluid communication with the air path, the mixing chamber, and the burner. The blower draws air through the air path into the mixing chamber where the air and gaseous fuel mix to form a fuel-air mixture and provides the fuel-air mixture to the burner. A pressure probe defines a pressure tap. The pressure probe extends through the elbow wall along the center axis. A sensor is in fluid communication with the orifice and the pressure tap. The sensor determines a pressure difference between the pressure tap and the orifice, and outputs a signal indicative of the pressure difference. A controller is in communication with the blower and the sensor. The controller determines an input airflow velocity from the signal and controls a speed of the blower in response to changes to the input air flow velocity.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
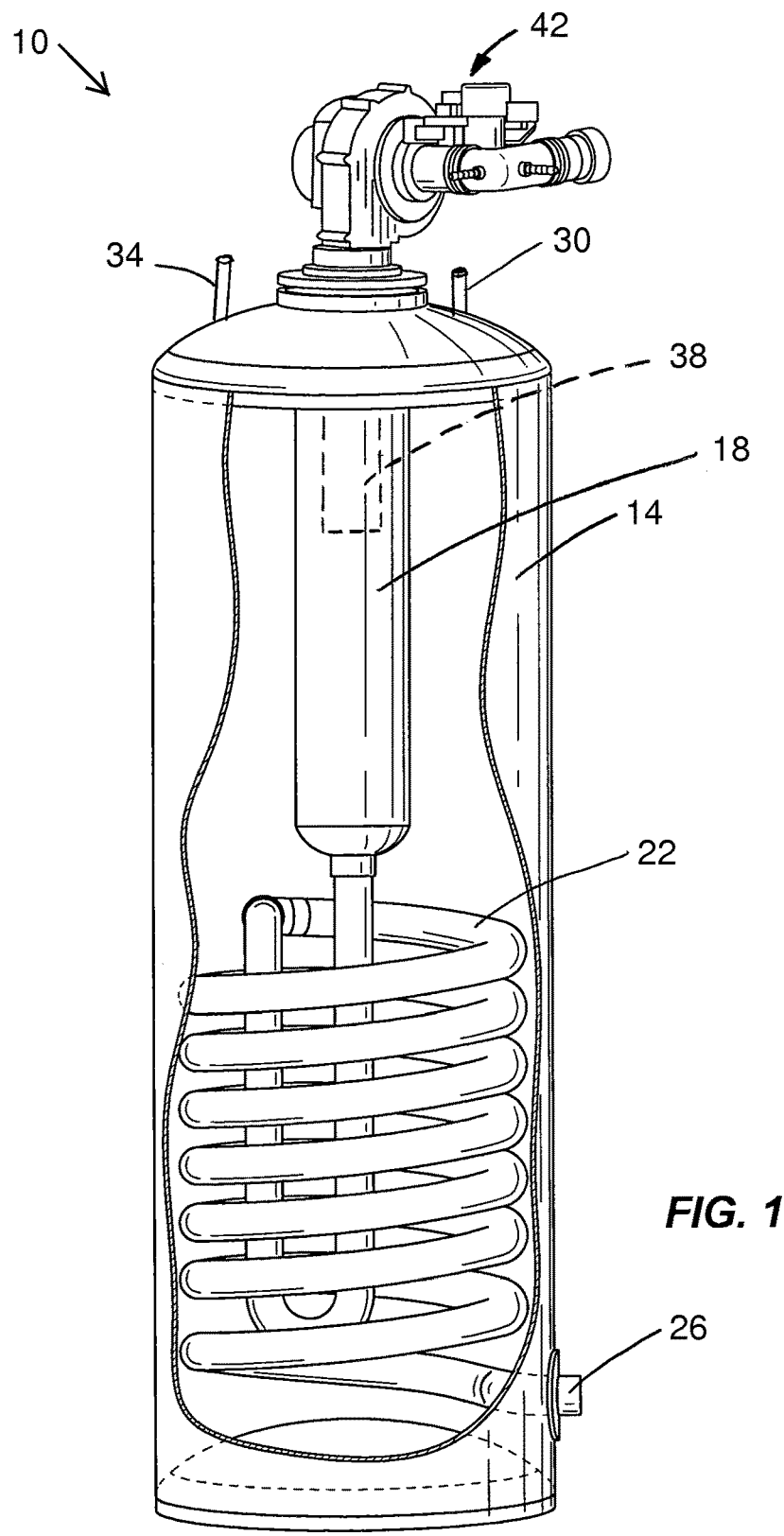
FIG. 1 is a cutaway-perspective view of a water heater.

FIG. 1 illustrates a gas-fired appliance 10. The gas-fired appliance 10 is shown as a water heater 10. The water heater 10 includes a water storage tank 14, a combustion chamber 18, a flue 22, an exhaust outlet 26, a cold water inlet 30, and a hot water outlet 34. A burner 38 is positioned in the combustion chamber 18. In operation, the hot products of combustion flow from the combustion chamber 18, through the flue 22, and exit through the exhaust outlet 26 while heating the water stored in the water storage tank 14. The cold water inlet 30 supplies water to the water storage tank 14. The hot water outlet 34 supplies hot water to an end-use location such as, for example, a faucet.

Figure 2:
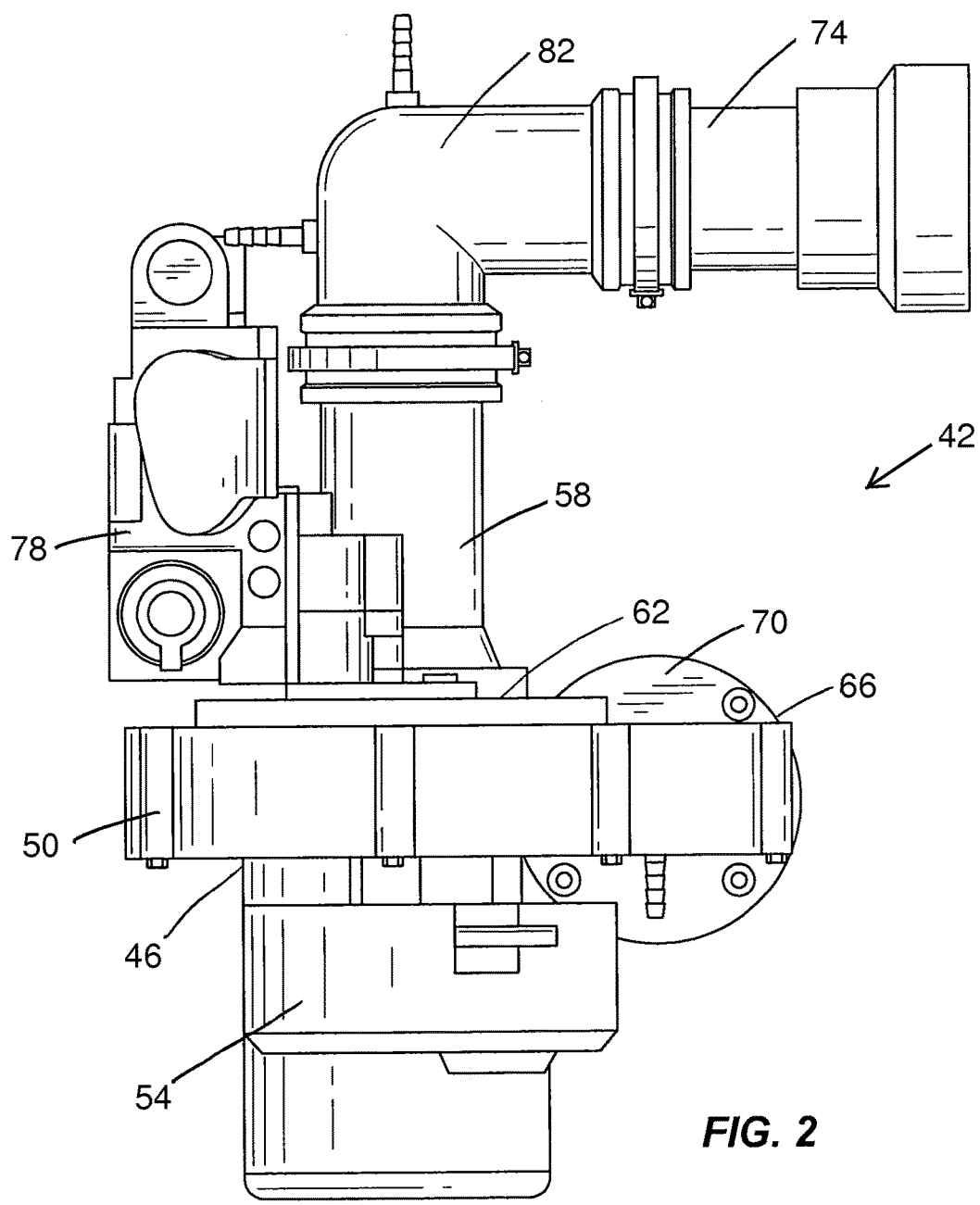
FIG. 2 is a top view of a combustion blower assembly of the water heater of FIG. 1.

An intake assembly 42 provides an air and gas mixture to the burner 38 for combustion. Referring to FIG. 2, the intake assembly 42 includes a blower 46 having an impeller housing 50 and a motor 54. A venturi 58, or mixing chamber, is coupled to an upstream end 62 of the blower 46, while a downstream end 66 of the blower 46 includes a flange 70 for connection to the combustion chamber 18. The venturi 58 receives air from an intake air conduit 74. A gas valve 78 is coupled to the venturi 58 to controllably supply gas to the venturi 58 for mixing with air from the intake air conduit 74. The gas valve 78 may be, for example, a solenoid-actuated valve. The resulting air/gas mix is ignited within the combustion chamber 18 (FIG. 1).

Figure 3:
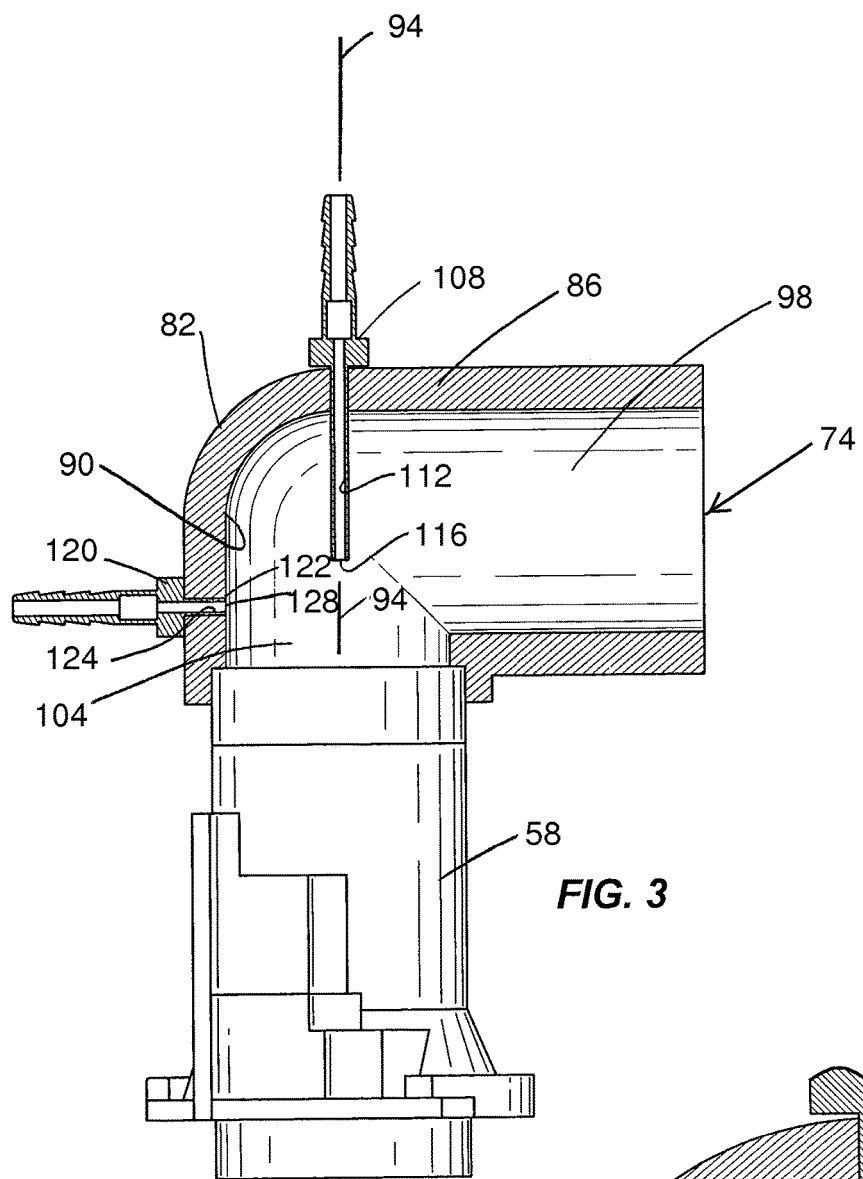
FIG. 3 is a cross-sectional view of an air inlet elbow of the combustion blower assembly of FIG. 2.

Referring to FIG. 3, the intake air conduit 74 includes an elbow 82 having a wall 86 with an inner surface 90 and a defining a center axis 94. The elbow 82 includes an inlet portion 98 and an outlet portion 104. The outlet portion 104 is substantially co-axial with the center axis 94, while the inlet portion 98 is oriented substantially perpendicular to the center axis 94. In other embodiments, the inlet portion may be at other orientations relative to the center axis.

A first pressure probe 108 extends through the inlet portion 98 of elbow 82 and is substantially co-axial with the center axis 94. The first pressure probe 108 defines a first fluid conduit 112 a first pressure tap 116 that are substantially aligned with the center axis 94.

A second pressure probe 120 extends through an orifice 122 defined in the outlet portion 104 of the elbow 82. The second pressure probe 120 is oriented substantially perpendicular to the center axis 94. The second pressure probe 120 defines a second fluid conduit 124, with an end portion of the second pressure probe defining a second pressure tap 128, flush with the orifice 122 of the elbow wall 86.

Figure 5:
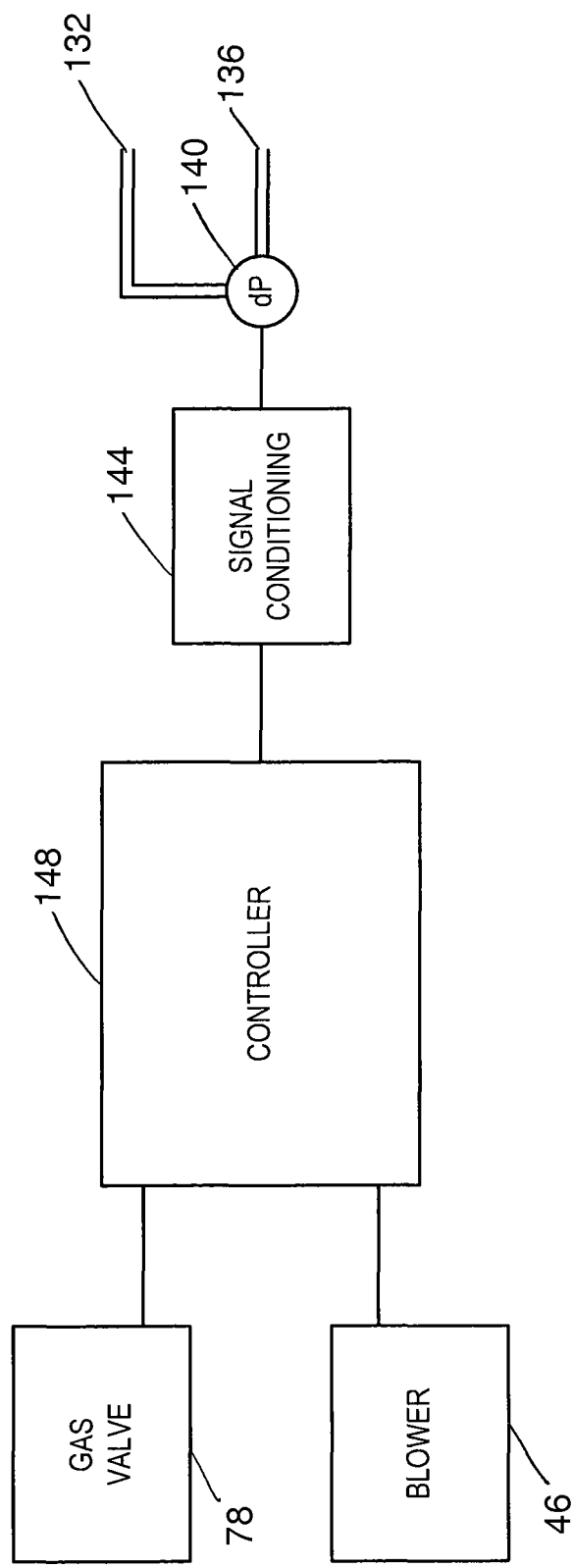
FIG. 5 is a block diagram of a controller for the combustion blower assembly of FIG. 2.

Referring to FIG. 5, the first pressure probe 108 and the second pressure probe 120 are in fluid communication with a first pressure port 132 and a second pressure port 136, respectively, of a pressure sensor, more specifically, a differential pressure sensor 140. The differential pressure sensor 140 determines a pressure difference between a first fluid pressure received at the first pressure port 132 (e.g., pressure within the first fluid conduit 112) and a second fluid pressure received at the second pressure port 136 (e.g., pressure within the second fluid conduit 124). The differential pressure sensor 140 outputs a differential pressure signal to a signal conditioning module 144. Although the differential pressure sensor 140 is illustrated as a single sensor, it will be appreciated that the differential pressure sensor may also be a combination of two more sensors from which a pressure difference may be determined.

From the signal conditioning module 144, the signal is provided to a controller 148. The controller 148 determines an input airflow velocity from the conditioned signal. The controller 148 is in communication with the blower 46 and controls a speed of the blower 46 in response to changes to the input air flow velocity. By adjusting the blower speed, the controller 148 is able to maintain a relatively constant thermal output of the burner 38 (FIG. 1). Referring to FIG. 5, in the illustrated embodiment, the controller 148 is additionally in communication with the gas valve 78 such that the controller 148 can shut off the flow of gas in response to unusual airflow conditions or other control parameters. In other embodiments, the gas valve 78 may be controlled by a separate controller, or other electronic or mechanical control means.

Figure 4:
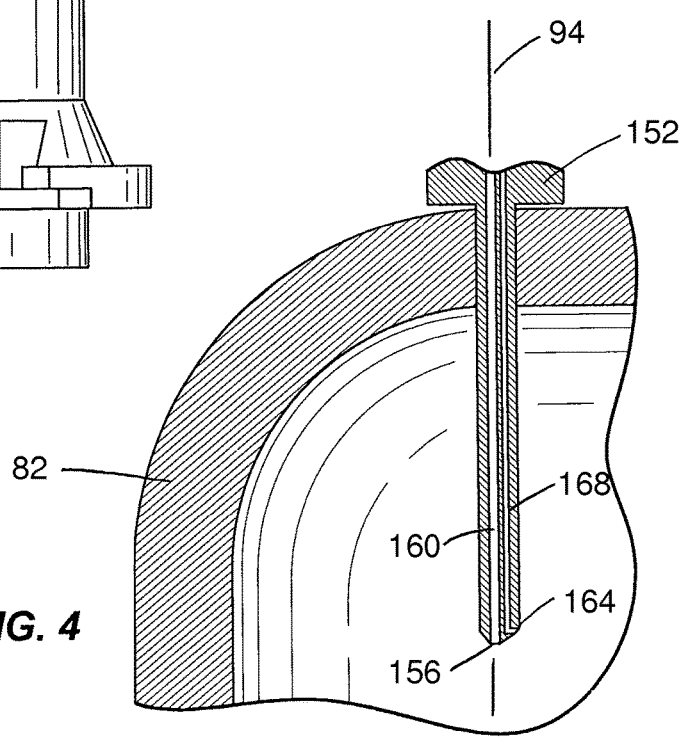
FIG. 4 is a cross-sectional view of an alternative configuration of an elbow assembly.

FIG. 4 illustrates a portion of the elbow 82 including a combination pressure probe 152 according to another embodiment of the invention. The combination pressure probe 152 extends through the elbow 82 along the center axis 94. The pressure probe 152 includes a first pressure tap 156 in fluid communication with a first fluid conduit 160, and a second pressure tap 164 in fluid communication with a second conduit 168. The first conduit 160 and second conduit 168 are substantially parallel to the center axis 94. The first pressure tap 156 is substantially aligned with the center axis 94, while the second pressure tap 164 is oriented substantially perpendicular to the axis 94. The first fluid conduit 160 and second conduit 168 are in fluid communication with a differential pressure sensor, e.g., in fluid communication with the first pressure port 132 and the second pressure port 136, respectively, of differential pressure sensor 140 of FIG. 5.

Figure 6:
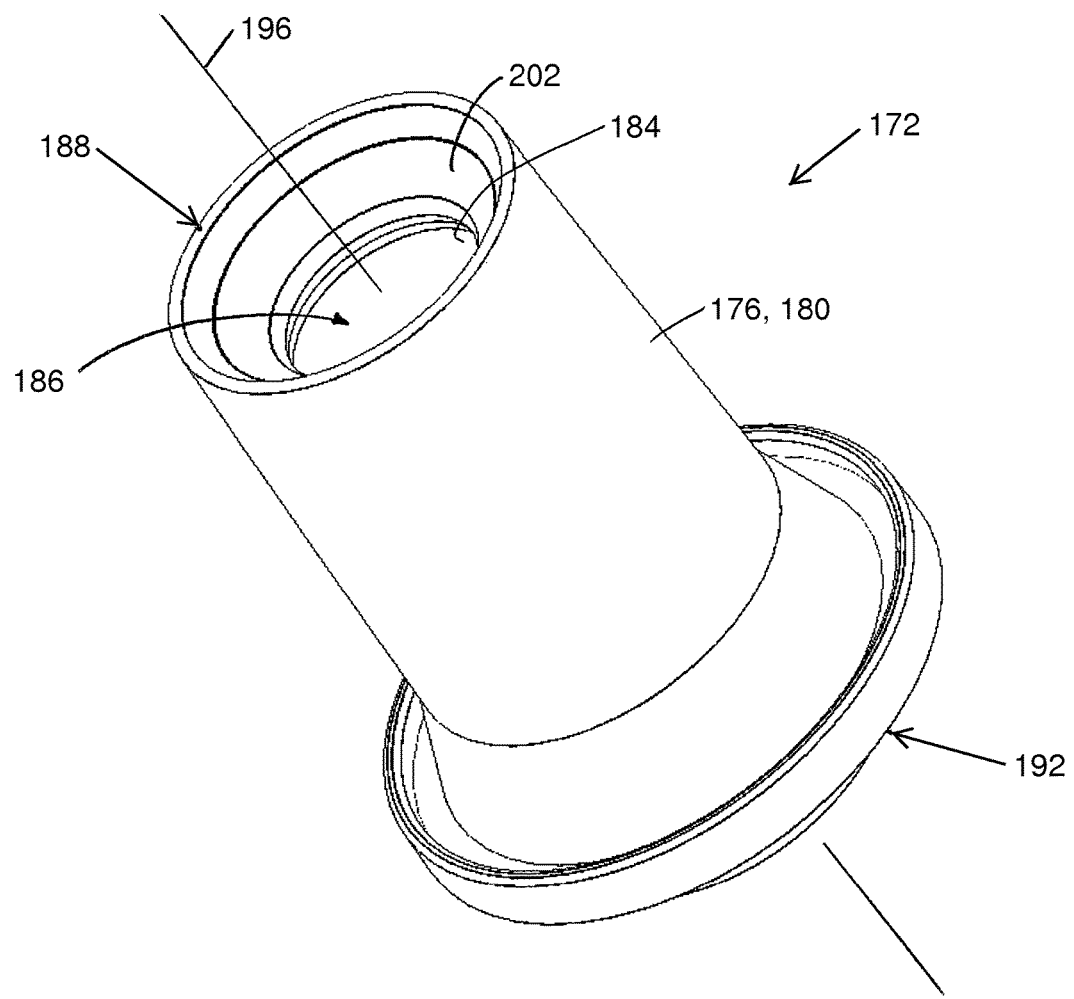
FIG. 6 is a perspective view of an air/gas venturi.
Figure 7:
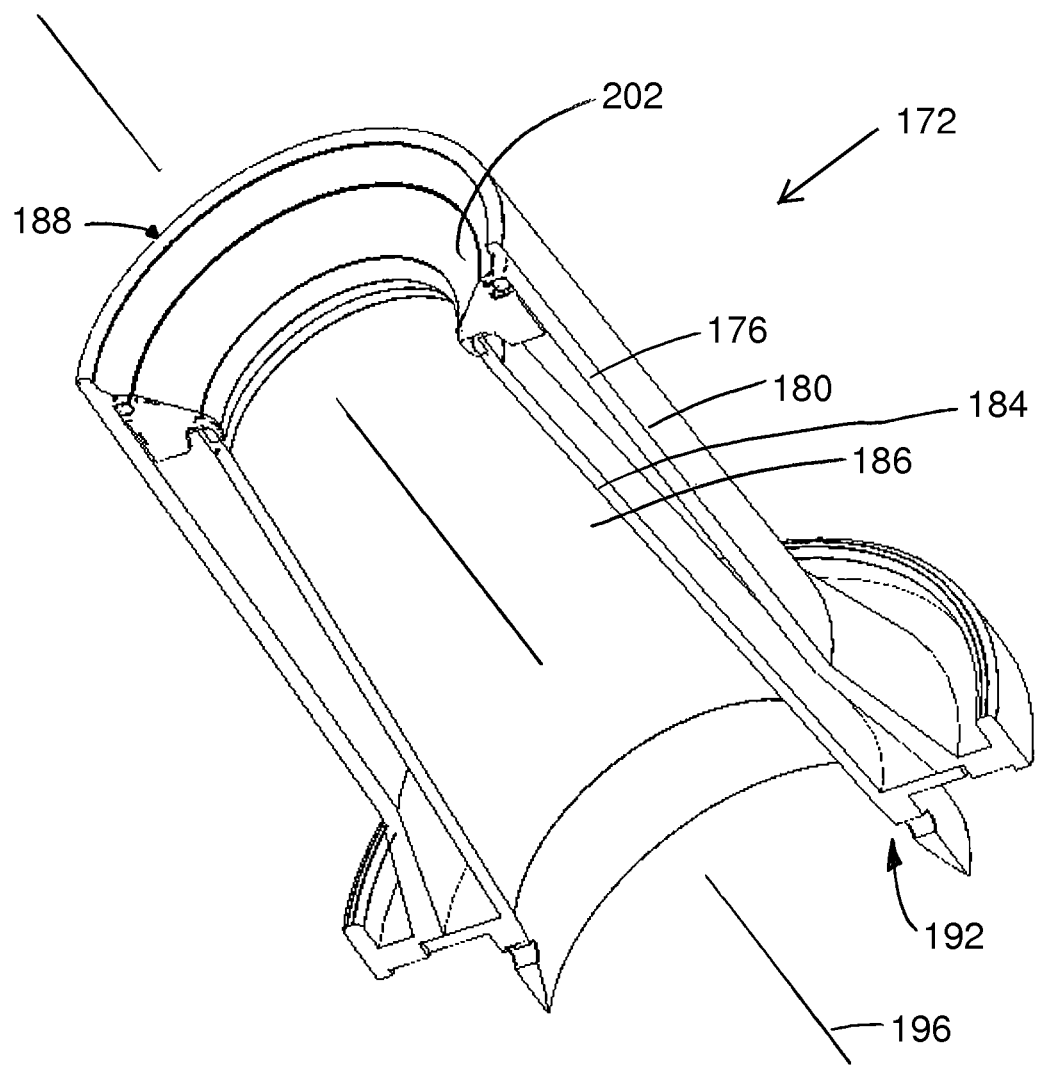
FIG. 7 is a cross-sectional view of the air/gas venturi of FIG. 6.

FIG. 6-7 illustrates a venturi 172 according to another embodiment of the invention. The venturi 172 of FIGS. 6-7 may be used interchangeably with the venturi 58 of FIG. 2. The venturi 172 is double-walled, with an outer wall 176 defining an outer surface 180 of the venturi 172, and an inner wall 184 defining a mixing chamber 186. The inner wall 184 and outer wall 176 extend from an inlet end 188 to an outlet end 192 about an axis 196. Referring to FIG. 7, an annular inlet fairing 202 supports the inner wall 184 at the inlet end 188 and additionally provides for a smooth transition between the inner wall 184 and the outer wall 176.

The venturi reference numerals described with respect to FIGS. 6-7 will also be used with respect to the embodiments disclosed in FIGS. 8-16. Pressure probe assemblies 206 (FIG. 8), 242 (FIGS. 9-10), 286 (FIGS. 11-12), 326 (FIGS. 13-14), 354 (FIGS. 15-16), as described below, are intended to be used as a substitute for the pressure probes 108 and 120 illustrated and described with respect to FIG. 2, and are similarly in fluid communication with a differential pressure sensor (e.g., the differential pressure sensor 140 of FIG. 5).

Figure 8:
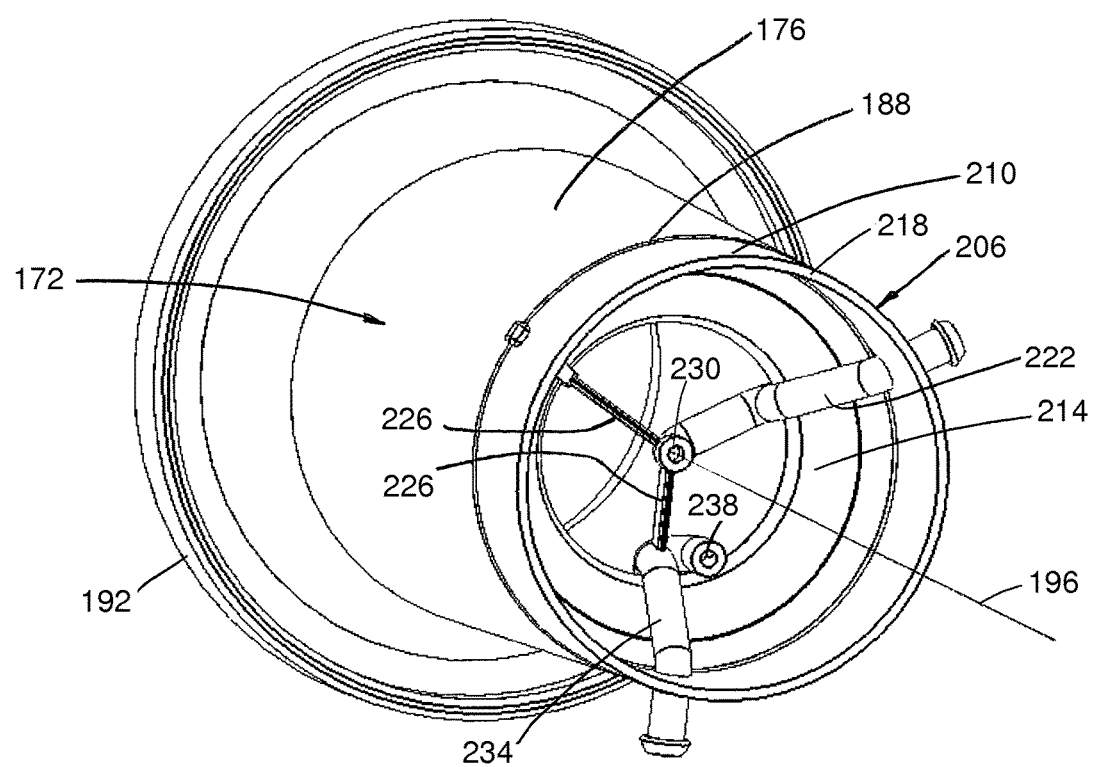
FIG. 8 is a perspective view of a pressure probe assembly and venturi.

FIG. 8 illustrates the venturi 172 with a pressure probe assembly 206 coupled to the inlet end 188. The pressure probe assembly 206 includes a support member 210 coupled to the outer wall 176 of the venturi 172. The support member 210 is disposed coaxially about axis 196 and includes a radially inwardly extending end wall 214 and an axially extending cylindrical wall 218.

A first pressure probe 222 extends through the cylindrical wall 218 towards the axis 196. The first pressure probe 222 is supported by strut members 226 that are coupled to the support member 210. The first pressure probe 222 defines a first pressure tap 230 that is oriented in an upstream direction along axis 196. Due to the orientation of the first pressure tap 230, the first pressure probe 222 substantially receives a stagnation pressure of airflow through the venturi 172. Therefore, the first pressure probe 222 may be described as a pitot tube.

A second pressure probe 234 extends through the cylindrical wall 218 to an inwardly radial position adjacent the end wall 214. The second pressure probe 234 defines a second pressure tap 238 that is oriented in an upstream direction adjacent the end wall 214. By coupling the first pressure probe 222 and second pressure probe 234 to a differential pressure sensor (e.g., the differential pressure sensor 140 of FIG. 5), a controller can determine an airflow rate within the venturi.

Figure 9:
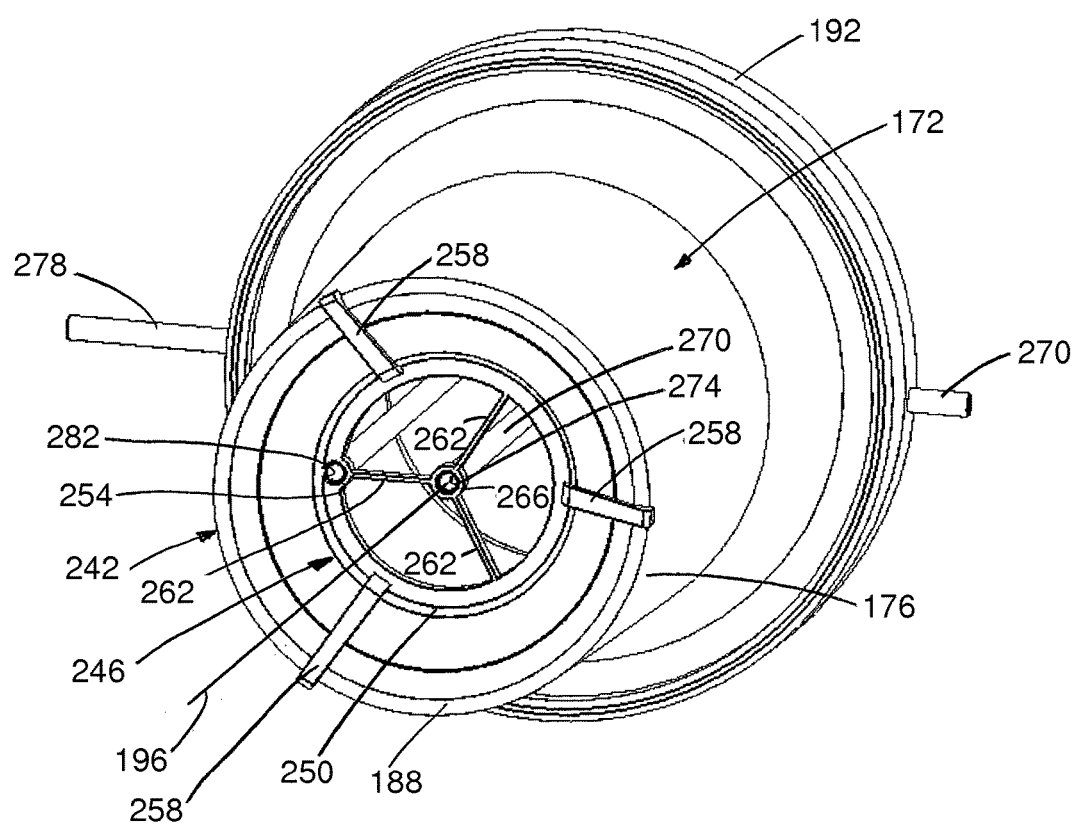
FIG. 9 is a perspective view of a pressure probe assembly and venturi according to another embodiment of the invention.
Figure 10:
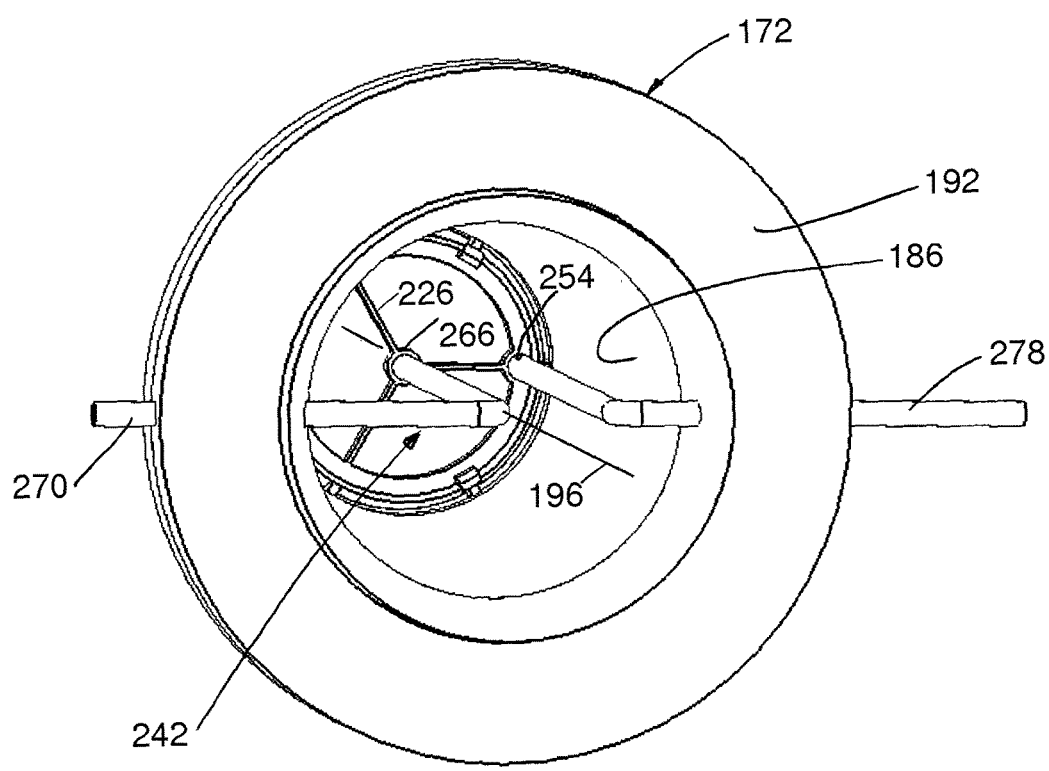
FIG. 10 is another perspective view of the pressure probe assembly and venturi of FIG. 9.

FIGS. 9 and 10 illustrate the venturi 172 with a pressure probe assembly 242 according to another embodiment of the invention. The pressure probe assembly 242 includes a support assembly 246. The support assembly 246 includes an annular body 250 that is disposed within the inlet end 188 of the venturi 172. A support aperture 254 is defined within the annular body 250. Three hook members 258 extend radially outward from the annular body 250. The hook members 258 engage the inlet end 188 of the outer wall 176 of the venturi 172. Strut members 262 extend radially inward from the annular body 250. The strut members 262 terminate at a central support ring 266 that is substantially co-axial with the axis 196.

Referring to FIG. 10, a first pressure probe 270 extends through the outlet end 192 of the venturi 172, substantially perpendicular to the axis 196. At the axis 196, the first pressure probe 270 turns approximately ninety degrees and extends along the axis 196 from the outlet end 192 to the inlet end 188 of the venturi 172. Referring to FIG. 9, at the inlet end 188, the first pressure probe 270 is supported within the central support ring 266 and defines a first pressure tap 274. Due to the orientation of the first pressure tap 274, the first pressure probe 270 substantially receives a stagnation pressure of airflow through the venturi 172. Therefore, the first pressure probe 270 may be described as a pitot tube Referring to FIG. 10, a second pressure probe 278 extends through the outlet end 192 of the venturi 172, substantially perpendicular to the axis 196. The second pressure probe 278 turns approximately ninety degrees to extend adjacent the mixing chamber wall 186 and substantially parallel to the axis 196. The second pressure probe 278 is supported within the support aperture 254 of the annular body 250 and, referring to FIG. 9 defines a second pressure tap 282 that is oriented in an upstream direction. By coupling the first pressure probe 270 and second pressure probe 278 to a differential pressure sensor (e.g., the differential pressure sensor 140 of FIG. 5), a controller can determine an airflow rate within the venturi.

Figure 11:
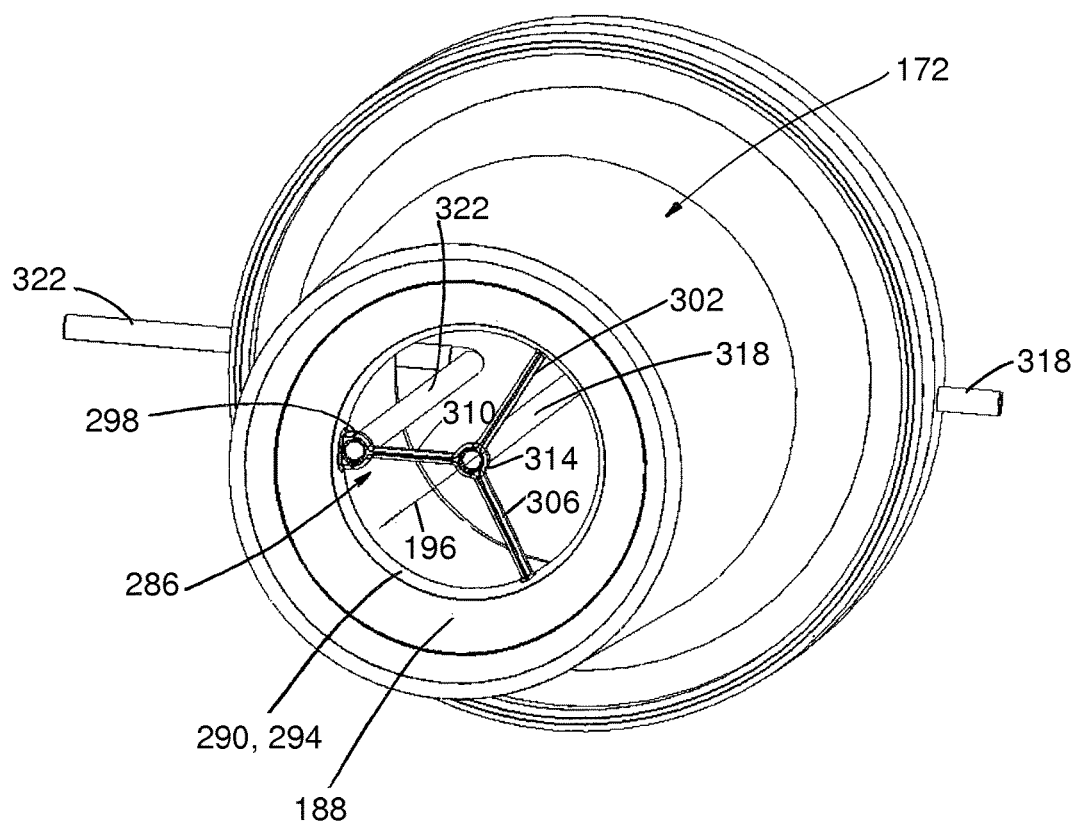
FIG. 11 is a perspective view of a pressure probe assembly and venturi according another embodiment of the invention.
Figure 12:
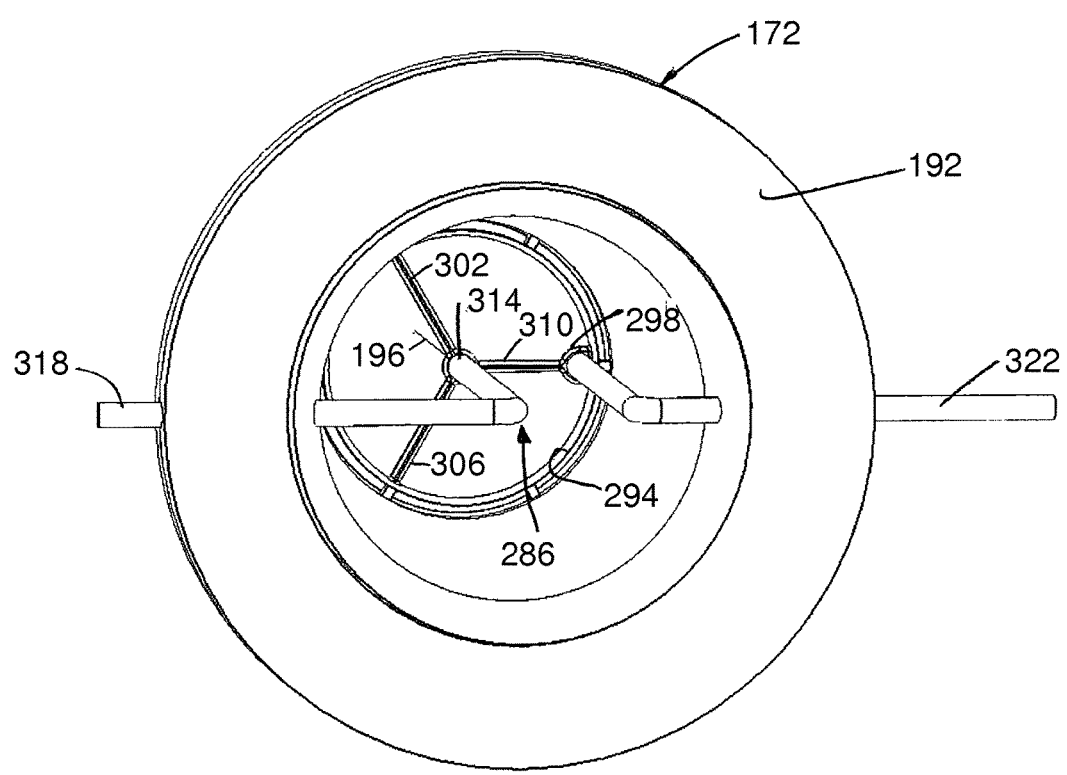
FIG. 12 is another perspective view of the pressure probe assembly and venturi of FIG. 11.

FIGS. 11 and 12 illustrate the venturi 172 with a pressure probe assembly 286 according to another embodiment of the invention. The pressure probe assembly 286 has substantial similarities to that illustrated in FIGS. 9-10, and only the differences will be described herein. The pressure probe assembly 286 includes a support member 290 having an annular flange 294 that is seated upon the inlet end 188 of the venturi 172. A support lug 298 extends radially inward from the annular flange 294. First and second strut members 302, 306 extend radially inward from the annular flange. A third strut member 310 extends radially inward from the support lug 298. The strut members 302, 306, 310 terminate at a central support ring 314 that is substantially co-axial with the axis 196 of the venturi 172. A first pressure probe 318 is supported within the central support ring 314. A second pressure probe 322 is supported within the support lug 298.

Figure 13:
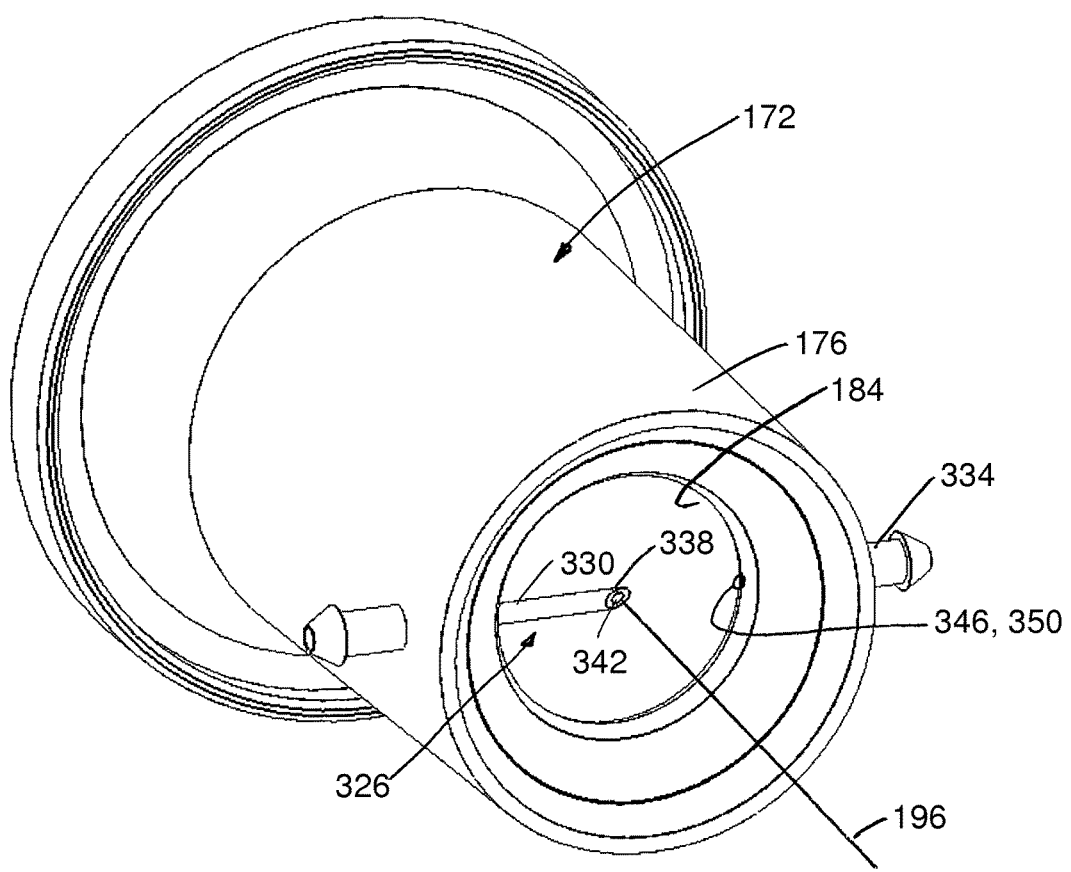
FIG. 13 is a perspective view of a pressure probe assembly and venturi according to yet another embodiment of the invention.
Figure 14:
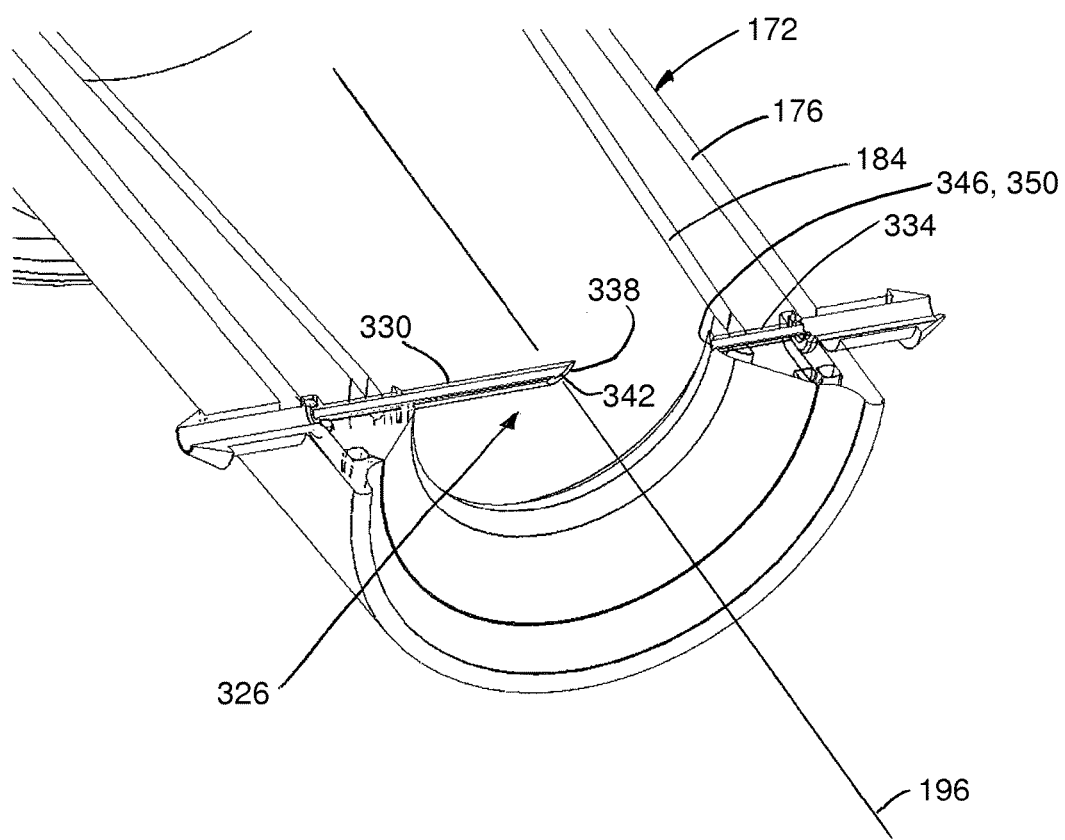
FIG. 14 is a cross-sectional view of the pressure probe assembly and a portion of the venturi of FIG. 13.

FIGS. 13-14 illustrate the venturi 172 with a pressure probe assembly 326 according to yet another embodiment of the invention. The pressure probe assembly 326 includes a first pressure probe 330 and a second pressure probe 334. Both the first pressure probe 330 and the second pressure probe 334 extend through the outer wall 176 and inner walls 184 of the venturi 172, perpendicular to the axis 196. A tapered end portion 338 of the first pressure probe 330 is adjacent the axis 196, and defines a first pressure tap 342. Due to the orientation of the first pressure tap 342, the first pressure probe 330 substantially receives a stagnation pressure of airflow through the venturi 172. Therefore, the first pressure probe 330 may be described as a pitot tube.

An end portion 346 of the second pressure probe 334 is substantially flush with the inner wall 184 of the venturi 172 at the inlet end 188 and defines second pressure tap 350. The second pressure tap 350 is oriented substantially perpendicular to the axis 196. Due to the location and orientation of the second pressure tap 350, the second pressure probe 334 substantially receives a static pressure of airflow through the venturi 172.

Figure 15:
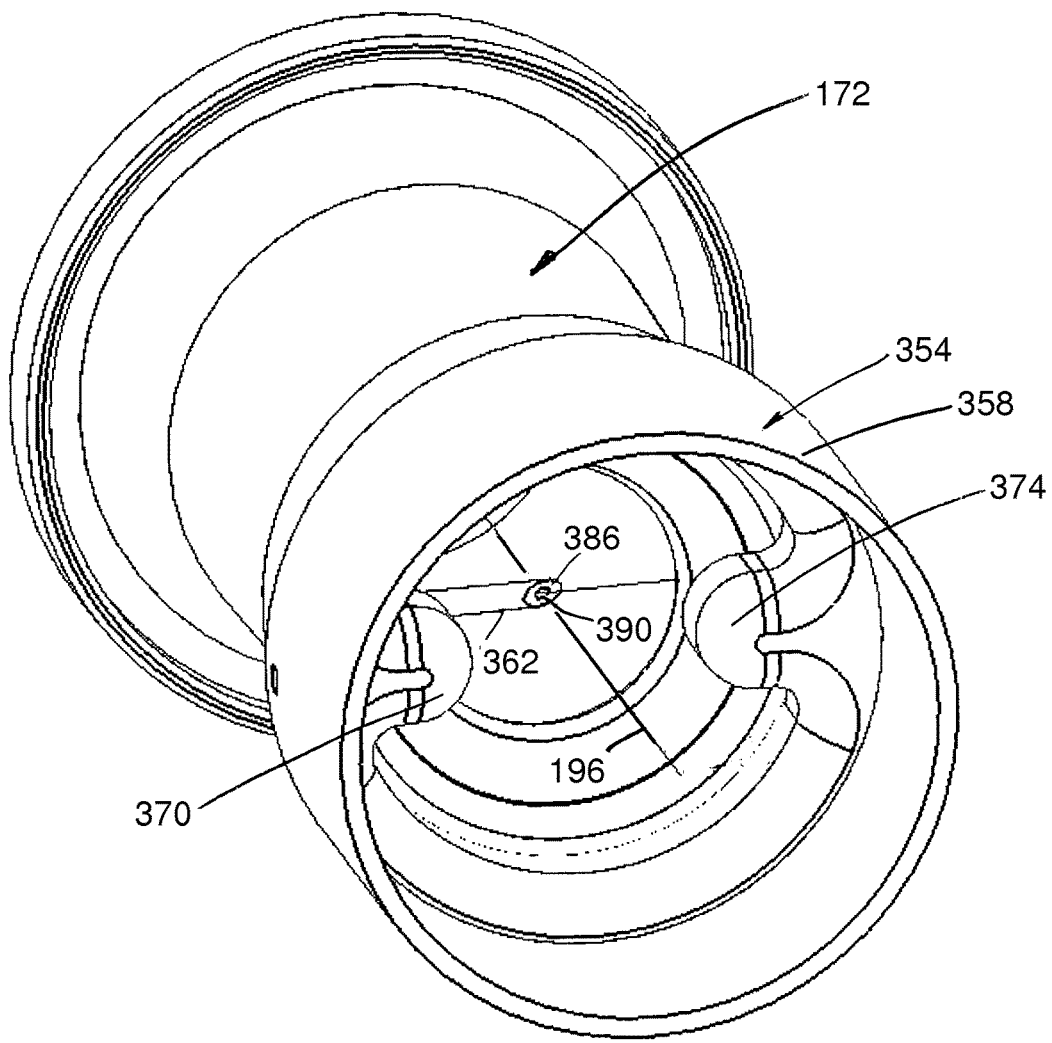
FIG. 15 is a perspective view of a pressure probe assembly and venturi according to yet another embodiment of the invention.
Figure 16:
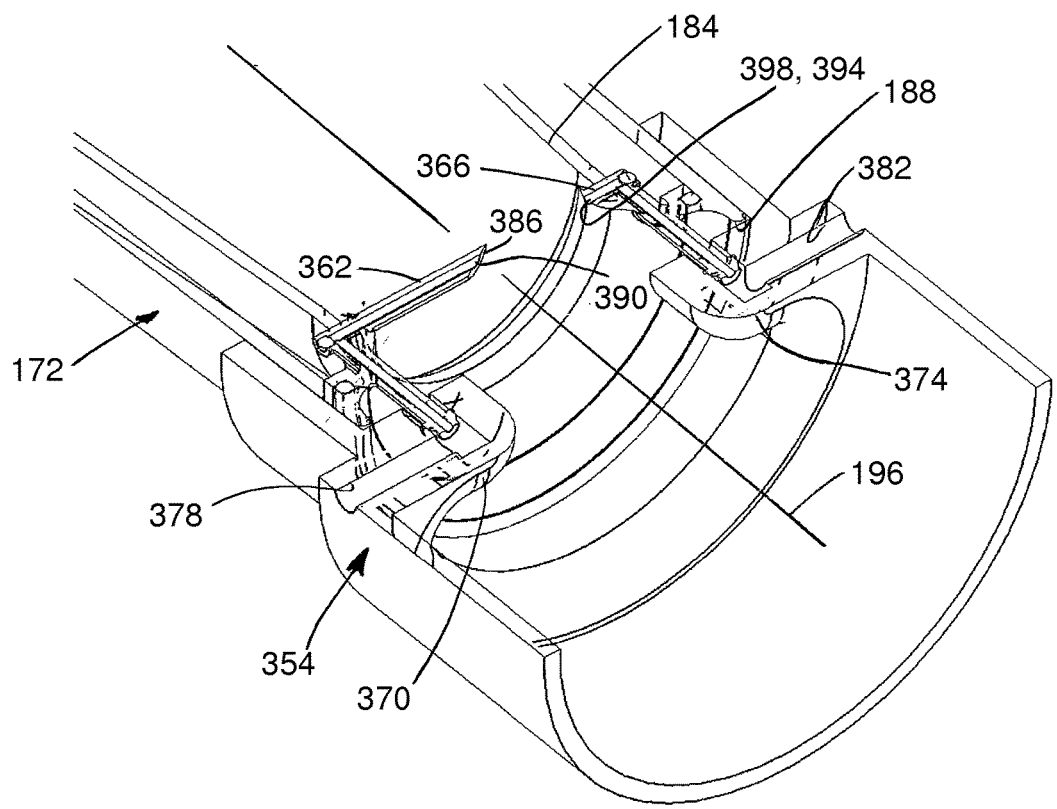
FIG. 16 is a cross-sectional view of the pressure probe assembly and a portion of the venturi of FIG. 15.

FIGS. 15-16 illustrate a venturi 172 with a pressure probe assembly 354 according to still yet another embodiment of the invention. The pressure probe assembly 354 includes an annular support cap 358, a first pressure probe 362, and a second pressure probe 366. The annular support cap 358 is configured to receive the inlet end 188 of the venturi 172. The annular support cap 358 includes a first radial fairing 370 and a second radial fairing 374. The first radial fairing 370 and second radial fairing 374 extend radially inward toward the axis 196. Referring to FIG. 16, the first radial fairing 362 defines a first fluid conduit 378 that is in fluid communication with the first pressure probe 362. The second radial fairing 374 defines a second fluid conduit 382 that is in fluid communication with the second pressure probe 366.

Both the first pressure probe 362 and the second pressure probe 366 extend perpendicular to the axis 196. A tapered end portion 386 of the first pressure probe 362 is adjacent the axis, and defines a first pressure tap 390. Due to the orientation of the first pressure tap 390, the first pressure probe 362 substantially receives a stagnation pressure of airflow through the venturi 172. Therefore, the first pressure probe 362 may be described as a pitot tube.

An end portion 394 of the second pressure probe 366 lies adjacent to the inner wall 184 of the venturi 172 at the inlet end 188. A second pressure tap 398 is defined in the end portion 394 of the second pressure probe 366. The second pressure tap 398 is oriented substantially perpendicular to the axis 196. Due to the orientation and position of the second pressure tap 398, the second pressure probe 366 substantially receives a static pressure of airflow through the venturi 172.

Thus, the invention provides, among other things, a pressure probe assembly for use with a gas fired appliance. Various features and advantages of the invention are set forth in the following claims.

What is claimed is:

1. A water heater assembly comprising:
a water storage tank;
a burner;
a flue positioned in the water storage tank, the flue receiving products of combustion from the burner;
an elbow surrounding a fluid path, the elbow including a wall with an inner surface, a center axis, an inlet portion substantially perpendicular to the center axis, and an outlet portion substantially perpendicular to the center axis, the inner surface being symmetrical about the centerline;
a mixing chamber surrounding the fluid path and coupled to the outlet portion of the elbow;
a first fluid conduit coupled to the elbow and having a first pressure tap extending through the inlet portion of the elbow and disposed substantially adjacent to the center axis;
a second fluid conduit coupled to the elbow and having a second pressure tap extending through an orifice defined in the outlet portion and disposed substantially adjacent the mixing chamber wall and flush with the orifice of the wall of the elbow;

a gas valve in fluid communication with the mixing chamber, the gas valve operable to provide gaseous fuel to the mixing chamber;

a blower in fluid communication with the fluid path, the mixing chamber, the elbow, and the burner, the blower for drawing air through the fluid path into the mixing chamber where the air and gaseous fuel mix to form a fuel-air mixture and providing the fuel-air mixture to the burner;

a sensor in fluid communication with the first fluid conduit and the second fluid conduit, the sensor determining a pressure difference between a first fluid pressure within the first fluid conduit and a second fluid pressure within the second fluid conduit and outputting a signal indicative of the pressure difference; and a controller in communication with the blower and the sensor, the controller
determining an input airflow velocity from the signal and
maintaining a constant thermal output of the burner by controlling a speed of the blower in response to changes to the input air flow velocity.

2. The water heater assembly of claim 1, wherein the first fluid conduit is a pitot tube for measuring a stagnation pressure within the mixing chamber.

3. The water heater assembly of claim 1, wherein the first pressure tap is oriented in an upstream direction along the center axis.

4. The water heater assembly of claim 3, wherein the second pressure tap is oriented substantially perpendicular to the center axis.

5. The water heater assembly of claim 1, wherein the second pressure tap is oriented substantially perpendicular to the center axis.

6. The water heater assembly of claim 1, wherein the first fluid conduit is defined by a first pressure probe extending radially through the mixing chamber side wall toward the center axis.

7. The water heater assembly of claim 1, wherein the second fluid conduit is defined by a second pressure probe extending radially through the mixing chamber side wall toward the center axis.

8. The water heater assembly of claim 1, wherein a portion of the first fluid conduit extends through the mixing chamber, parallel to the center axis.

9. The water heater assembly of claim 8, wherein a portion of the second fluid conduit extends through the mixing chamber, parallel to the center axis.

10. The water heater assembly of claim 1, wherein the first fluid pressure correlates to a stagnation pressure within the air path.

11. The water heater assembly of claim 1, wherein mixing chamber is a venturi for entraining the gaseous fuel with air from the air path.

12. A water heater comprising:
a water storage tank;
a burner;
a flue positioned in the storage tank, the flue receiving the products of combustion from the burner;
an air path including an elbow, the elbow having a wall with an inner surface, a center axis, and an orifice, the inner surface being symmetrical about the centerline and the orifice formed through the wall;
a mixing chamber;
a gas valve in fluid communication with the mixing chamber, the gas valve operable to provide gaseous fuel to the mixing chamber;
a blower in fluid communication with the air path, the mixing chamber, and the burner, the blower for drawing air through the air path into the mixing chamber where the air and gaseous fuel mix to form a fuel-air mixture and providing the fuel-air mixture to the burner;
a pressure probe defining a pressure tap, the pressure probe extending through the wall of the elbow along the center axis;
a sensor in fluid communication with the orifice and the pressure tap, the sensor determining a pressure difference between the pressure tap and the orifice, and outputting a signal indicative of the pressure difference; and
a controller in communication with the blower and the sensor, the controller determining an input airflow velocity from the signal and maintaining a constant thermal output of the burner by controlling a speed of the blower in response to changes to the input air flow velocity.

* * * * *